United States Patent [19]

Jackson

[11] 4,438,877
[45] Mar. 27, 1984

[54] HELMET RESTRAINING DEVICE

[76] Inventor: William S. Jackson, P.O. Box 7370, Ann Arbor, Mich. 48107

[21] Appl. No.: 503,525

[22] Filed: Jun. 13, 1983

[51] Int. Cl.³ .............................................. B62J 11/00
[52] U.S. Cl. .................................... 224/275; 297/195; 70/58
[58] Field of Search ................. 224/275, 30 R, 31, 39, 224/42; 2/189; 70/57, 58; 296/37.1; 297/188, 190, 195

[56] References Cited

U.S. PATENT DOCUMENTS

| | | | |
|---|---|---|---|
| 1,156,540 | 10/1915 | Marquis | 224/42.4 |
| 2,032,591 | 3/1936 | Pride | 280/179 |
| 3,762,191 | 10/1973 | Smith | 70/18 |
| 3,837,545 | 9/1974 | Rogers, Jr. | 224/31 |
| 3,940,166 | 2/1976 | Smithea | 297/195 |
| 4,059,207 | 11/1977 | Jackson et al. | 224/31 |
| 4,367,572 | 1/1983 | Zielenski | 24/301 |

FOREIGN PATENT DOCUMENTS

| | | | |
|---|---|---|---|
| 2369145 | 5/1978 | France | 224/275 |
| 275672 | 5/1951 | Switzerland | 224/30 R |
| 894831 | 4/1962 | United Kingdom . | |
| 1564952 | 4/1980 | United Kingdom . | |

*Primary Examiner*—Steven M. Pollard
*Attorney, Agent, or Firm*—Krass, Young & Schivley

[57] ABSTRACT

A helmet restraining device employing a seat strap which is pulled taut over the top surface of the saddle-seat of a vehicle and anchored at either end of the strap to the seat and an elliptically shaped restraining cup which is relatively elastic along the major axis of the elipse. A motorcycle helmet or the like is placed on the seat, over the seat strap, and the restraining cup is stretched over the helmet, the elliptical cup enveloping a substantial portion of the helmet. The two ends of the restraining cup are then secured to connector rings located on the seat strap, anchoring the helmet therebetween.

9 Claims, 4 Drawing Figures

HELMET RESTRAINING DEVICE

DESCRIPTION

TECHNICAL FIELD

This invention relates generally to portable carrier units for motor vehicles and more particularly to helmet restraining devices for motorcycles.

BACKGROUND ART

Various types of holders have been designed for securing a helmet to a motorcycle while it is in the parked position. These holders are typically straps which are anchored on one end to the motorcycle and carry means on the other end of the strap for releasably securing the helmet to the strap. While these strap holders provide a convenient means for storing the helmet when both the helmet at the motorcycle are not in use, they have proven less than adequate for carrying the helmet while the motorcycle is moving. The dangling helmet may be scratched and dented when it bangs up against the frame of the motorcycle during the ride. To avoid the noise and damage to the helmet, riders often strap the helmet to a piece of their clothing such as a belt loop so that it rests against a portion of their body. While this may save damage to the helmet and the motorcycle, it could prove hazardous if the rider is thrown from the vehicle and somehow lands on the helmet. The present invention is directed to providing a means for maintaining an unused helmet in a safe, secure position on the motorcycle while that motorcycle is in motion.

DISCLOSURE OF THE INVENTION

In accordance with one aspect of the present invention a helmet restraining device is provided employing a seat strap securely anchored to the seat of the motorcycle, and a connected restraining cup which may be releasably secured to the seat strap and is of sufficient size and shape to cover a substantial portion of the top surface of the helmet and holds the helmet against the top surface of the back portion of the saddle-seat of the motorcycle.

The restraining cup is preferably made of a relatively elastic nylon mesh material and is generally elliptical in shape. Means are provided on each of the two ends of the restraining cup for releasably securing the cup to the seat strap. In the preferred embodiment the ends of the cup are provided with hook and loop fastener tabs of sufficient length so that the elliptical shaped cup can be pulled tightly over the dome of the helmet to secure the helmet in position on the seat. A standard hook and loop fastener which is used for this purpose is manufactured under the trade name of Velcro by Velcro USA, Inc.

The seat strap is provided with anchoring means which hook underneath either side of the saddle-seat of the motorcycle. These anchoring means are preferably metal hooks having eyelets for accomodating the end of the strap. One end of the seat strap is preferably provided with means for releasably securing the strap such as a Velcro strip. The other end of the seat strap is provided with means for adjusting the length of the strap, preferably a slider buckle. The seat strap is installed by positioning each of the anchoring means in place along the edge of the saddle-seat and about either side of the seat. The length of the strap is then adjusted so that it is pulled taut across the top surface of the saddle-seat and provides sufficient tension to securely anchor the hooks over the edges of the seat. The seat strap is provided with a pair of connector rings slideably mounted upon the strap and positioned on the top surface of the saddle-seat at a sufficient distance such that each of the rings may receive one end of the restraining cup while the cup is extended over the surface of the helmet and the helmet is positioned on top of the seat and between the connector rings. When the seat strap is not being used to anchor a helmet to the seat, it may serve several alternate functions, such as a handhold for a passenger or a restraining strap for small, flat objects.

To release the helmet, one or both ends of the Velcro fasteners may be released on the cup. The restraining cup may then be conveniently folded into a small bundle about the size of a pair of sunglasses, and stored in the rider's pocket or underneath the motorcycle seat. The seat strap may be removed from the seat by simply releasing the Velcro tabbed end of the strap and removing the hooks from the bottom of the seat. Thus, the helmet restraining device is an accessory which is quickly installed, quickly removed, and easily folded into a convenient, lightweight package when not in use.

The helmet restraining device thus provides a simple and convenient method of transporting an unused helmet in a relatively, safe, secure position on the back portion of the saddle-seat of the motorcycle.

BEST MODE FOR CARRYING OUT THE INVENTION

Figure 1:
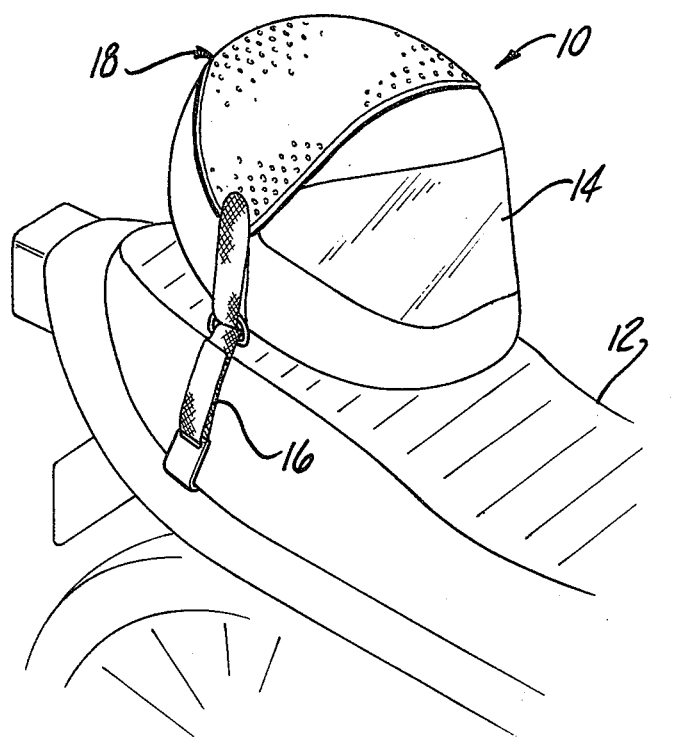
FIG. 1 is a perspective view of the present invention.
Figure 2:
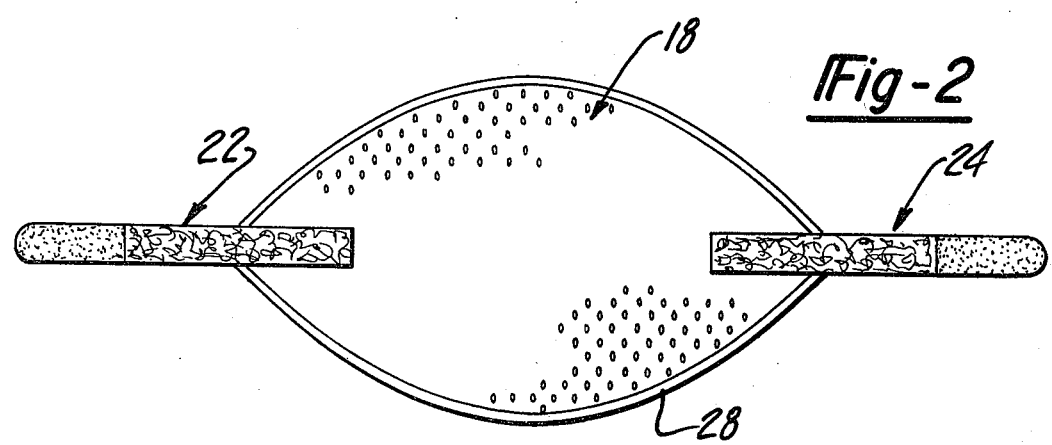
FIG. 2 is a top view of the restraining cup.
Figure 3:
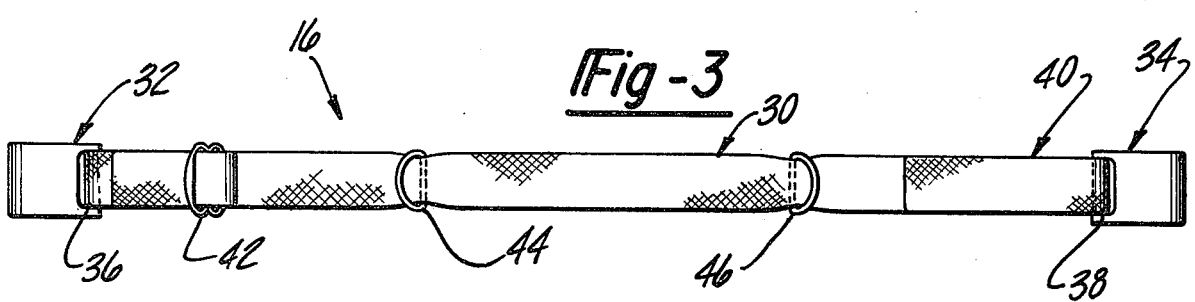
FIG. 3 is a top view of the seat strap.

Referring to the drawings, a preferred embodiment of the present invention, a helmet restraining device 10, is mounted upon a saddle-seat 12 of a motorcycle. The restraining device 10 broadly consists of an adjustable seat strap 16 adapted to be releasably secured over the top surface of the saddle-seat 12 and an elliptical restraining cup 18 releasably secured at either end to the seat strap 16. The restraining cup 18 is stretched over the top surface of the helmet 14 and tightly secured to the seat strap 16 anchoring the helmet 14 therebetween. In contrast to other helmet restraining straps which allow the helmet to dangle from the edge of the seat, the elliptical cup 18 of the present invention envelops a substantial portion of the top surface of the helmet, ensuring that the helmet 14 will be maintained in a stationary position while the motorcycle is moving.

The restraining cup 18 may include two fasteners 22 and 24 fixably secured to the cup 18 at opposite ends of the cup along its major axis. The elliptical cup 18 is preferably made of a nylon mesh material, elastic in the direction of its major axis. The nylon mesh is preferably surrounded by an inelastic border 28 of sufficient circumference that, as the mesh is stretched along its major axis, the border restrains the outer edges, thus causing the mesh to assume a concave shape suitable for accommodating the spherical top surface of the helmet.

As will be appreciated by those skilled in the art, the restraining cup 18 may be made of a variety of fabrics of varying elasticity without departing from the spirit of the present invention. Similarly, the cup 18 may be composed of a relatively inelastic material having a generally concave shape. It should also be noted that the fabric cup may be replaced by a series of resilient fabric strips, sewn together to form a harness which fits over the top surface of the helmet, without departing from the spirit of the invention. A pair of fasteners 22 and 24, are fixably secured to the elliptical cup 18 at either end of the cup along its major axis. These fasteners are preferably made of a resilient woven fabric material and are sewn to the restraining cup 18. Although Velcro fasteners are employed in the preferred embodiment, a snap or buckle may be suitably substituted for this purpose. It should be noted that the restraining cup is suitable for effectively securing any generally spherical object, such as a ball, to a motorcycle.

The seat strap is comprised of an inelastic strap portion 30, preferably made of a resilient woven fabric, and a pair of anchoring means 32 and 34 releasably secured to each end respectively of the strap portion 30. In a preferred embodiment, the anchoring means 32 and 34 are generally flat metal hooks, although the anchors may be composed of any other rigid material such as heavy-duty plastic. The strap portion 30 of the seat strap is threaded through slots 36 and 38 in each of the anchoring hooks 32 and 34.

Figure 4:
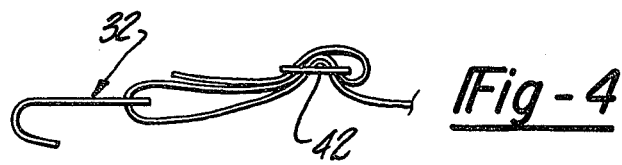
FIG. 4 is a side view of one end of the seat strap and the slider buckle.

In the preferred embodiment one end of the strap portion 30 is provided with Velcro fastening material for easily installation and removal. The second end of the strap portion 30 is preferably threaded through a slider buckle 42. This second end is threaded in a manner shown in FIG. 4 so that, in addition to securing the second end of the strap portion 30 to the adjacent anchoring means 32, the overall length of the strap portion 30 may be altered by drawing a greater or lesser length of the second end through the slider buckle 42. Thus, while each of the two ends of the strap portion 30 of the seat strap 16 may be provided with any means for releasably securing those ends to the anchoring means 32 and 34, the combination of a slider buckle 42 and Velcro fastener 40 shown in the preferred embodiment has been found to provide both easy adjustment and quick installation and removal of the seat strap 16. A pair of D-shaped connector rings 44 and 46 are threaded onto the strap portion 30 of the seat strap 16.

As will be appreciated by those skilled in the art, the seat strap 30 may be replaced with any anchoring means which will receive the fastening ends of the restraining cup 18. For example, anchoring hooks 32 and 34 might be modified to directly receive and hold each of the fasteners 22 and 24 securely to the seat.

In operation, the seat strap 16 is placed over the top of the saddle-seat of the vehicle and each of the anchoring hooks 32 and 34 is positioned such that the hooks engage the lower edge of the seat 12 of the vehicle. A sufficient amount of the strap portion 30 is threaded through the slider buckle 42 to ensure that the strap will fit taut across the top surface of the seat 12 and maintain sufficient tension to secure each of the anchoring hooks 32 and 34 to the seat edge. The other end of the strap portion 30 of the seat strap 16 is then pulled tight and secured and the connector rings 44 and 46 are slideably spaced at either edge of the seat. The helmet 14 is then placed on the seat 12 on top of the seat strap 16. One end of the restraining cup 18 is threaded through one of the connector rings 44 or 46 and secured. The restraining cup 18 is then pulled over the top surface of the cup envelops the top surface relatively taut so that the cup envelops the top surface of the helmet 14. The second end of the restraining cup 18 is then threaded through the remaining connector ring 44 or 46 and is secured.

To remove the helmet 14, the operator may simply release the Velcro fastener at either one of the ends 22 or 24 of the restraining cup 18. While the helmet 14 is in use, the restraining cup 18 may be removed completely from the seat strap 16, folded to a relatively small size and conveniently stored in a pocket or storage compartment located on the motorcycle. The seat strap 16 may be removed from the seat 12 by simply releasing the Velcro fastener at the first end 40 of the strap. As with the restraining cup 18 the seat strap 16 may be folded up and stored in a relatively small area.

It will be appreciated from the foregoing that a helmet restraining device 10 is disclosed which securely anchors the helmet 14 to a seat 12 of a vehicle. The device may be quickly installed or removed from the vehicle when not in use.

I claim:

1. A restraining device for securing motorcycle helmets or the like to cycles comprising:
    a seat strap;
    a pair of anchoring means releasably secured at each end respectively of the seat strap for engaging the vehicle and securing the seat strap across a top surface of the vehicle;
    means for adjusting the length of the seat strap to insure a tight fit;
    a pair of connector rings slidably mounted upon the seat strap;
    a restraining cup adapted to cover a substantial section of the top surface of the helmet; and
    a pair of fastener means fixedly secured at opposite ends of the restraining cup, each fastener including means for releasably securing each end respectively of the restraining cup to each of the connector rings thereby securing the restraining cup to the seat strap and the helmet therebetween.

2. The restraining device of claim 1 wherein said means for adjusting the length of the seat strap is a slider buckle.

3. The restraining device of claim 1 wherein the anchoring means is a hook constructed of a rigid material, the hook containing a slot for receiving one end of the seat strap.

4. The restraining device of claim 1 wherein the fastener means for releasably securing the restraining cup to the connector rings is a hook and loop fastener.

5. The restraining device of claim 1 wherein the seat strap is made of a resilient woven fabric.

6. The restraining device of claim 1 wherein the restraining cup is generally elliptical in shape.

7. The restraining device of claim 1 wherein the restraining cup is made of an elastic nylon mesh material.

8. A restraining device for securing motorcycle helmets or the like to cycles comprising:
    a cup member consisting of an elliptically shaped section of resilient sheet material;
    a strap means secured to the cup at opposed ends of its major axis; and,
    means for releasably retaining said strap means to the cycle whereby the helmet or the like may be secured between the cup and the cycle with the cup stretched over the helmet or the like.

9. The restraining device of claim 8 wherein the means for retaining the strap means to the cycle comprises an elongated strap adapted to be secured to the cycle and having a pair of connector rings slideably mounted thereon.

* * * * *